United States Patent
Chen (12)

(10) Patent No.: US 6,313,604 B1
(45) Date of Patent: Nov. 6, 2001

(54) CHARGING SEAT FOR A RECHARGEABLE FLASHLIGHT

(76) Inventor: Han-Liang Chen, 1 Fl., No. 6-2, Lane 78, Sungchiang Rd., Taipei (TW)

(*) Notice: Subject to any disclaimer, the term of this patent is extended or adjusted under 35 U.S.C. 154(b) by 0 days.

(21) Appl. No.: 09/629,848

(22) Filed: Aug. 1, 2000

(51) Int. Cl.$^7$ .................................................. H01M 10/46
(52) U.S. Cl. .......................................... 320/114; 320/115
(58) Field of Search ................................... 320/112, 114, 320/115

(56) References Cited

U.S. PATENT DOCUMENTS

| | | | |
|---|---|---|---|
| 3,829,676 | * | 8/1974 | Nelson et al. . |
| 4,092,580 | * | 5/1978 | Prinsze . |
| 4,536,694 | * | 8/1985 | McCarty et al. . |
| 5,321,349 | * | 6/1994 | Chang . |
| 5,908,233 | * | 6/1999 | Heskett et al. . |

* cited by examiner

Primary Examiner—Edward H. Tso
(74) Attorney, Agent, or Firm—Rosenberg, Klein & Lee

(57) ABSTRACT

A charging seat for rechargeable flashlight includes a base, a holding portion formed on the base to fixedly clamp the flashlight therein, an orientation device provided on the base to limit the flashlight to a predetermined angle when engaged with the holding portion and a charging circuit provided in the base. The charging circuit is electrically connected with a pair of contact buttons provided on the base. The buttons correspond to a pair of contact plates provided on the rechargeable flashlight. When the flashlight is fixed in the charging seat a charging connection is established between the flashlight and the charging circuit, and batteries received in the flashlight are directly charged.

3 Claims, 4 Drawing Sheets

CHARGING SEAT FOR A RECHARGEABLE FLASHLIGHT

BACKGROUND OF THE INVENTION

1. Field of the Invention

The present invention relates to a charging seat for a flashlight, which is able to fixedly hold a rechargeable flashlight therein and charge the rechargeable flashlight directly.

2. Description of Related Art

Flashlights are not only useful in our homes for emergency use, but are also used in various special fields, e.g. technicians, security personnel, and the police. For various special purposes, these people use flashlights so frequently that energy of batteries received in the flashlight is consumed very quickly. If these batteries are discarded, a large amount of pollution is caused. Nowadays, rechargeable batteries are gradually becoming accepted by more and more consumers instead of conventional batteries that are used once. However, if the rechargeable batteries provided in a conventional flashlight need to be charged, they are removed first and then fitted in a charger. Afterwards the charged batteries are fitted in the flashlight again. The repeated removing and refitting of the batteries is troublesome to users who use the rechargeable flashlights frequently.

Therefore, it is an objective of the invention to provide an improved charger that is able to charge a flashlight directly to mitigate and/or obviate the aforementioned problems.

SUMMARY OF THE INVENTION

The object of the present invention is to provide a charging seat which comprises a holding device to fix a flashlight therein, an orientation device and a charging circuit, whereby a flashlight is directly fixed in the charging seat in a predetermined direction to be electrically connected with the charging circuit of the charger for charging.

The detailed features of the present invention will be apparent in the detailed description with appropriate reference to the accompanying drawings.

DETAILED DESCRIPTION OF THE PREFERRED EMBODIMENT

Figure 1:
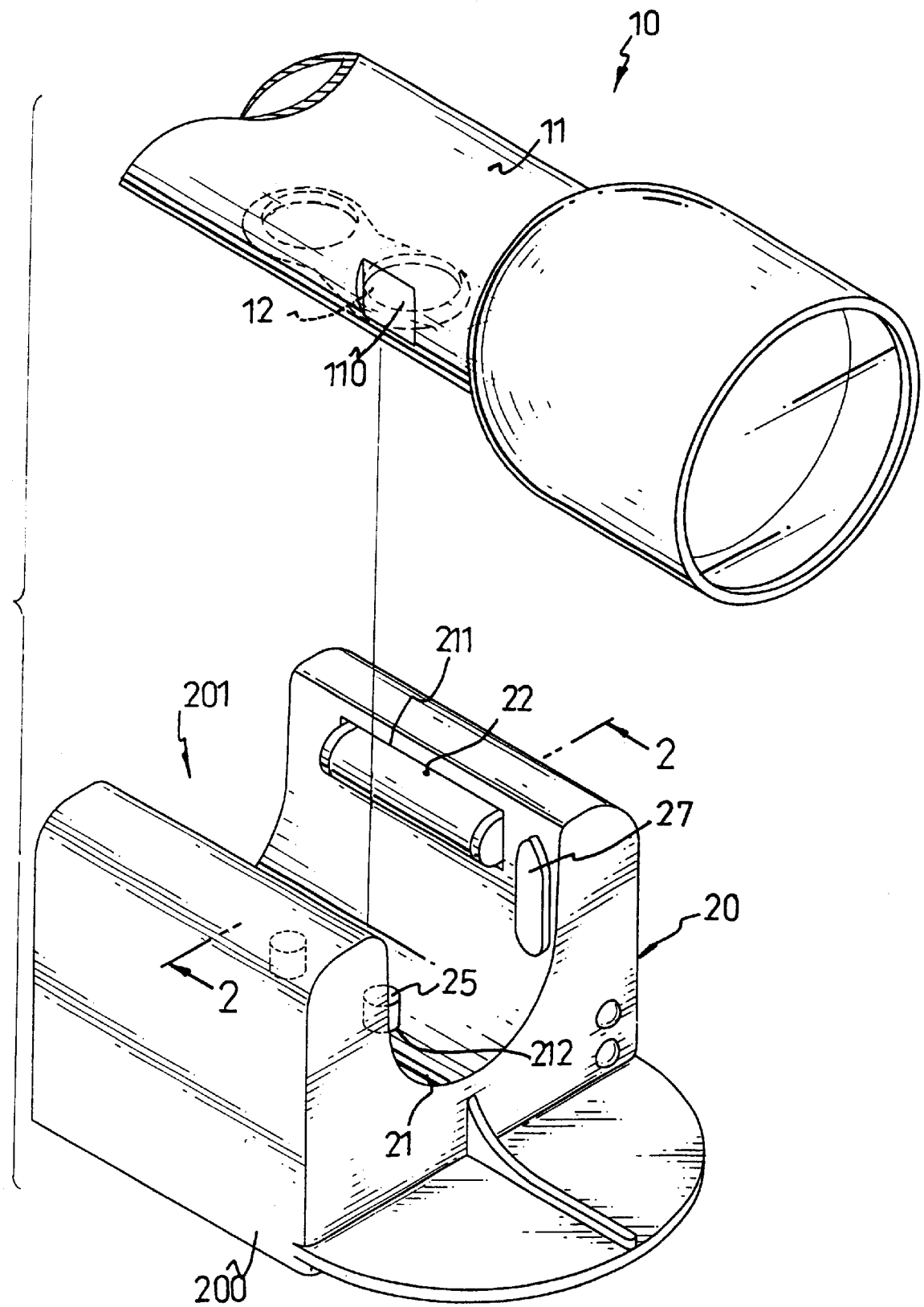
FIG. 1 is a perspective view of a first embodiment of a charging seat in accordance with the present invention.
Figure 2:
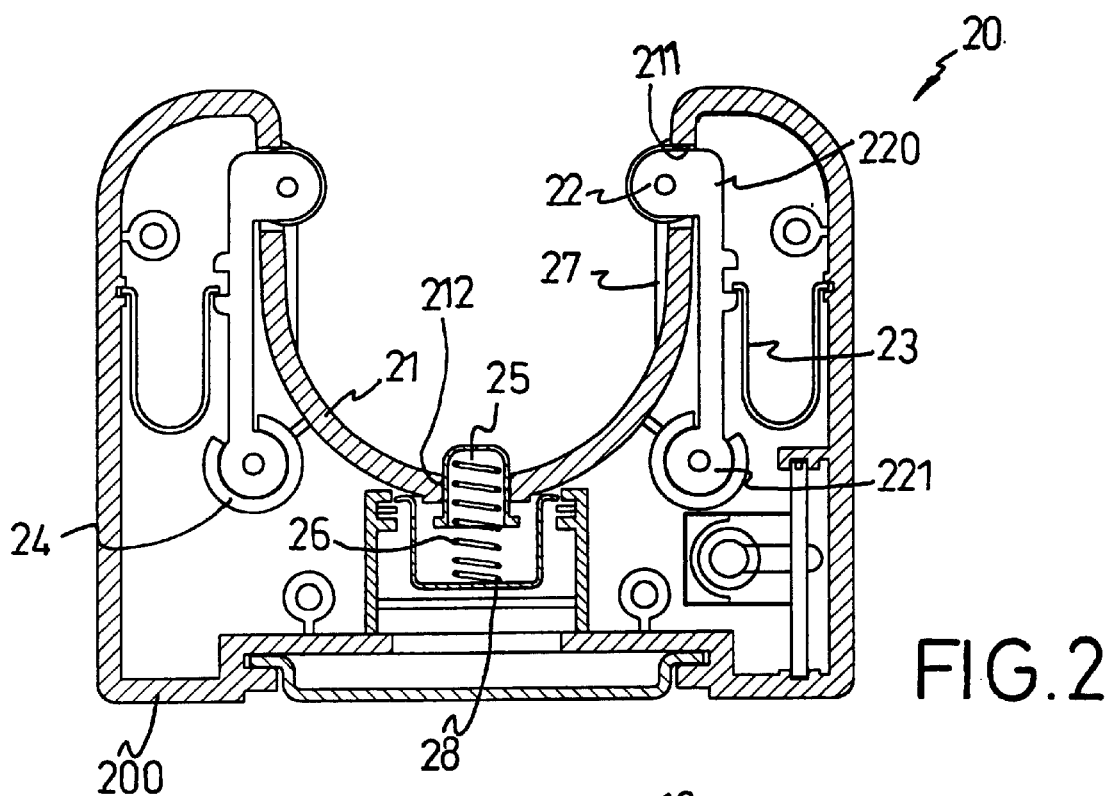
FIG. 2 is a cross-sectional view of the first embodiment of the charging seat in accordance with the present invention.

A first embodiment of the present invention is shown in FIGS. 1 and 2. A rechargeable flashlight (10) has a cylinder (11) with two axially juxtaposed positioning recesses (110) defined in a periphery thereof. Two contact plates (12) are respectively disposed in the recesses (110). A charging seat (20) comprises a base (200) with a holding portion (201) formed thereon. The holding portion (201) has a U-shaped grove (21) defined therein extending horizontally, a holding device provided therein to fixedly clamp the flashlight (10) in the groove (21), and an orientation device provided therein to limit the flashlight (10) to be fixed in a predetermined positioning angle.

The holding device comprises a pair of elastic clamping blocks (22) extendable from two openings (211), which are symmetrically defined in two opposite sides of the groove (21). Each clamping block (22) is integrally formed with an extension (220) which is received in interior of the base (200). Each extension (220) has a tip end thereof formed with a pivot column (221), which is pivotally fitted in a pivot cup (24) integrally formed in interior of the base (200). Two U-shaped elastic members (23) are respectively provided between the two extensions (220) and the base (200), whereby the clamping blocks (22) pressed by the elastic members (23) are respectively extendable through openings (211) of the base (200) and press against the flashlight (10) to properly clamp the flashlight (10) in the grove (21) of the base (200).

Two contact buttons (25) are provided in the groove (21) corresponding to the two contact plates (12) of the flashlight (10). Each contact button (25) has an upper portion extended through a hole (212) defined in a bottom of the grove (21), and a lower end thereof formed with a flange which is retained by the respective hold (212). Two springs (26) are respectively provided between the contact buttons (25) and two copper blades (20) which are respectively secured in the base (200). A charging circuit is provided in the base (200) and electrically connected with the contact buttons (25) via the relative springs (26) and the relative copper blades (28).

Figure 3:
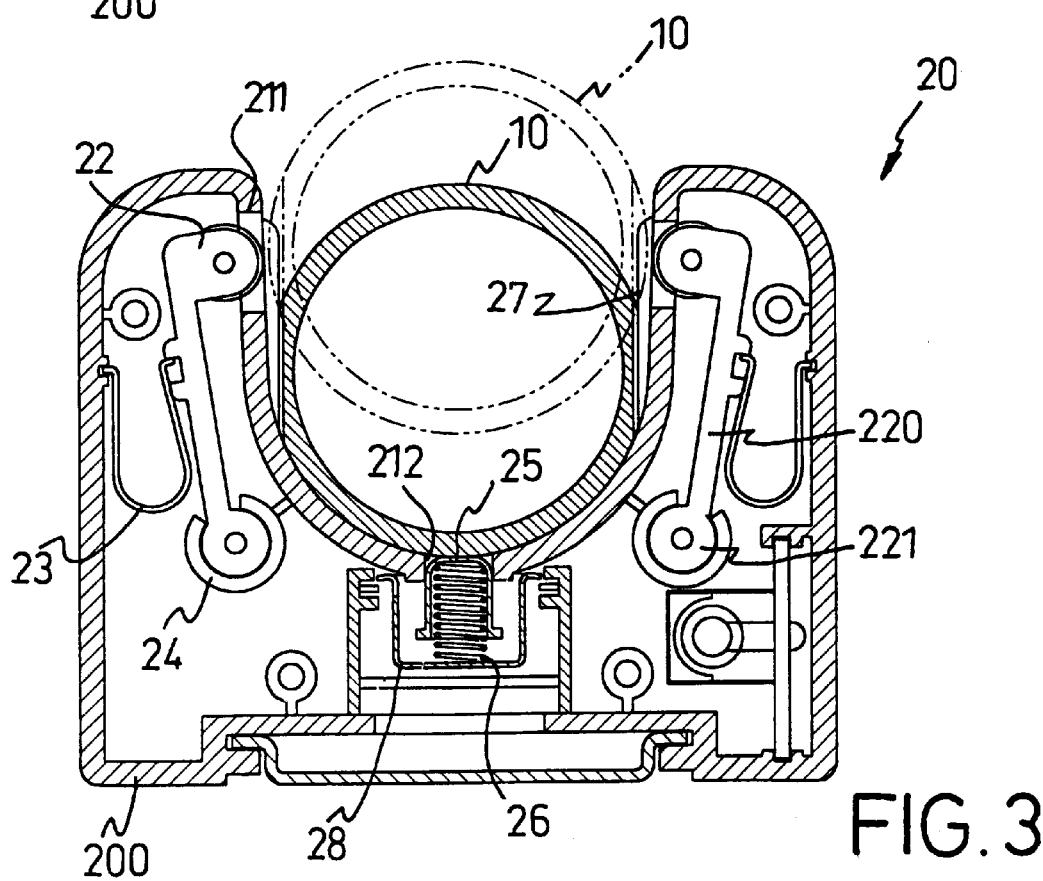
FIG. 3 is a cross-sectional view of the first embodiment of the charger in accordance with the present invention, showing a flashlight fitted in the charger.

Referring to FIG. 3, the flashlight (10) is inserted into the groove (21) of the base (200). The elastic clamping blocks (22) are respectively retracted to let the flashlight (10) pass therethrough, and then the resilience thereof presses against the flashlight (10) from opposite sides, thus the flashlight (10) is stably fixed in the grove (21).

The orientation device includes two guide blocks (27) secured at opposite sides of the groove (21) corresponding to the two positioning recesses (110) of the flashlight (10) to limit the flashlight (10) to be fitted in the base (10) in a predetermined angle, so that the contact plates (12) of the flashlight (10) are properly pressed against the contact buttons (25) of the charger (200). A charging connection is thus established, and batteries received in the flashlight (10) are directly charged.

Figure 4:
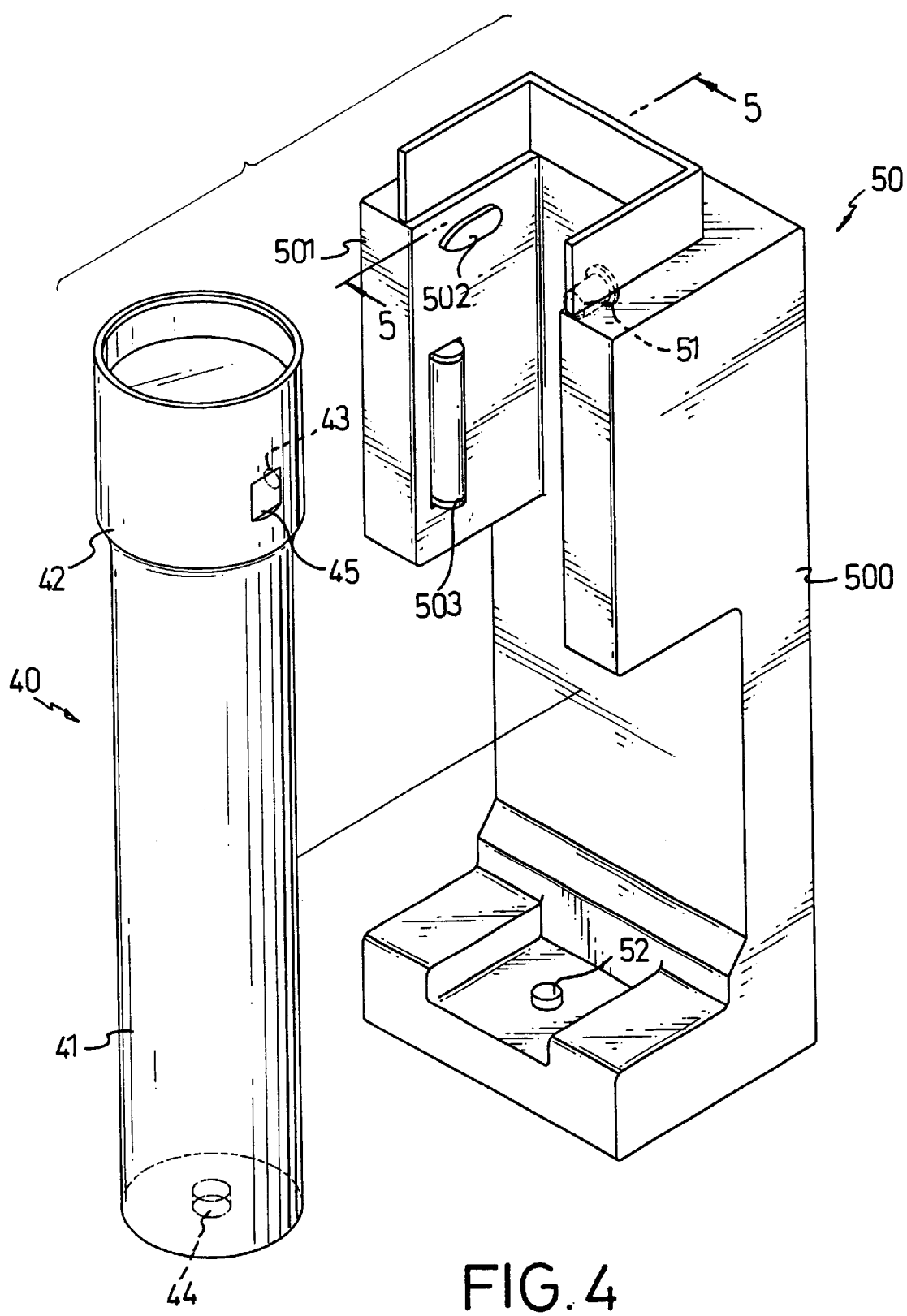
FIG. 4 is a perspective view of a second embodiment of the charging seat in accordance with the present invention.
Figure 5:
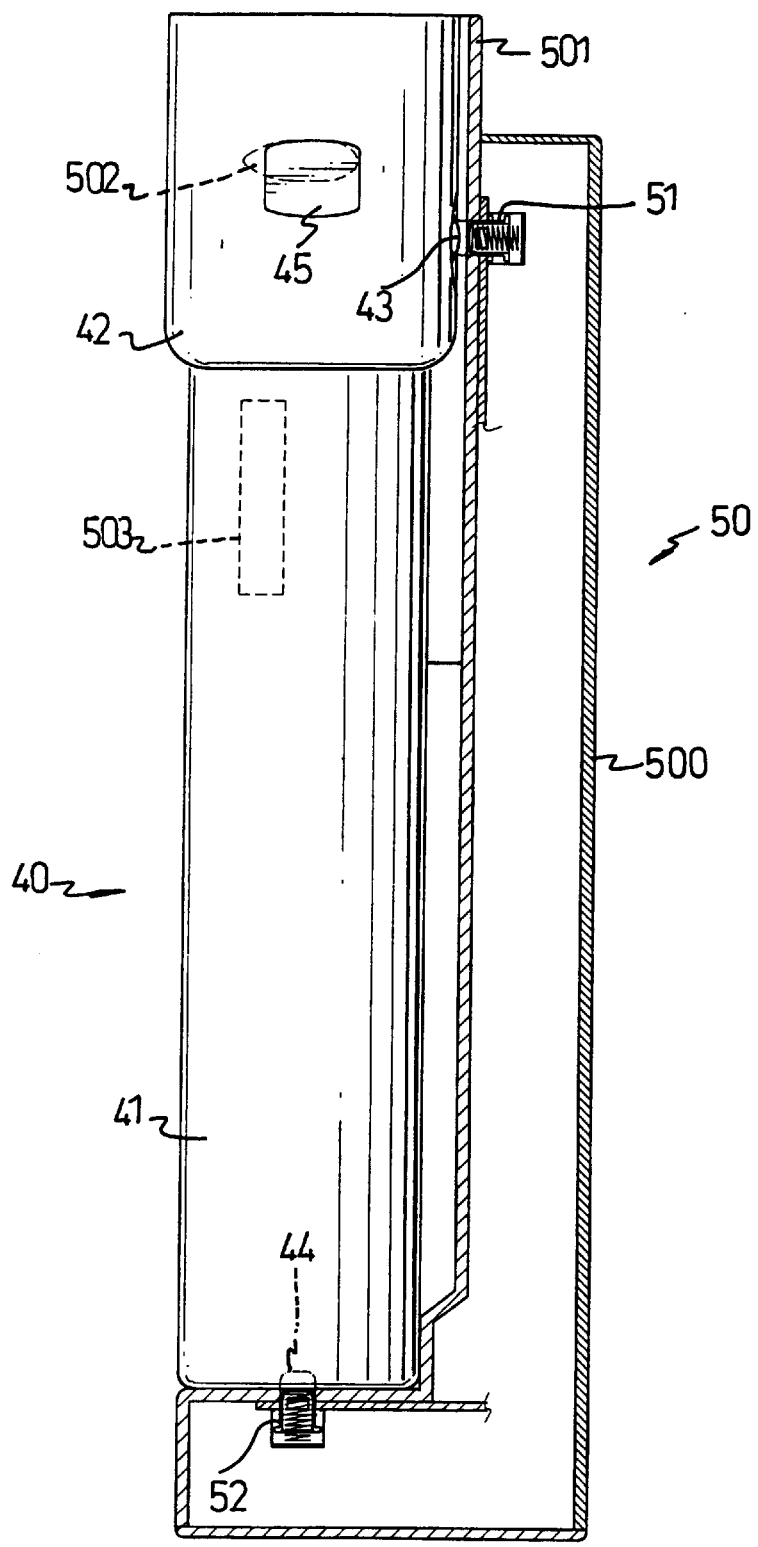
FIG. 5 is a side view of the second embodiment of the charging seat in accordance with the present invention, showing a flashlight fitted in the charger.

A second embodiment of the present invention is shown in FIGS. 4 and 5. A flashlight (40) has a cylinder (41) and a head portion (42). A first contact plate (43) is provided on the head portion (42) of the flashlight (40). A second contact plate (44) is provided on a bottom of the cylinder (41) of the flashlight (40). Two positioning recesses (45) are respectively defined at opposite sides of the head portion (42).

A charging seat (50) comprises a base (500) with a holding portion (501) formed thereon. The holding portion (501) has a U-shaped groove defined therein extending vertically, an orientation device (502) provided therein to limit the flashlight (40) fitted in a predetermined angle, and a holding device (503) provided therein to fixedly clamp the flashlight (40) in the groove. A first contact button (51) is provided in the holding portion (501) corresponding to the first contact plate (43) provided on the head portion of the flashlight (40). A second contact button (52) is provided on a horizontal upper surface of a bottom of the base (500) corresponding to the second contact plate (44) of the flashlight (40). A charging circuit is received in the base (500)

and electrically connected with the first and second contact buttons (51,52).

When the flashlight (40) is fitted in the charging seat (50), the flashlight (40) is fixedly clamped by the holding device (503), and the first and second contact plates (43,44) of the flashlight (40) are respectively pressed against the first and second contact buttons (51,52), thereby a charging connection between the charging seat (50) and the flashlight (40) is established, and the batteries received in the flashlight (40) are directly charged.

The advantage of the present invention is that the rechargeable flashlight is charged in the charging seat directly without removing batteries from the flashlight and then refitting them in the flashlight after the charging process is finished.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the board general meaning of the terms in which the appended claims are expressed.

What is claimed is:

1. A charging seat for a rechargeable flashlight, the charging seat comprising:

a base;

a holding portion formed on the base to fixedly hold the flashlight therein, the holding portion including (a) a U-shaped groove into which a rechargeable flashlight is received, the U-shaped groove having a pair of openings symmetrically formed through opposing sides of the U-shaped groove, (b) a pair of pivot cups integrally formed within the base, (c) a pair of extension members disposed within the base, each extension member having an elastic clamping block formed on one end thereof and being extendable into the U-shaped groove through a corresponding one of the openings and a pivot column formed on an opposing end of the extension, the pivot column being pivotally engaged with a respective one of the pivot cups, and (d) a pair of U-shaped elastic members respectively disposed between the pair of extension members and corresponding interior portions of the base for biasing the extension members to extend the elastic clamping blocks through the openings and thereby releaseably clamp the flashlight within the U-shaped groove;

a pair of contact buttons provided on the base adapted to correspond to a pair of contact plates provided on the rechargeable flashlight;

a charging circuit provided in the base and being electrically connected to the pair of contact buttons; and an orientation device provided on the base so as to limit the flashlight to be fixed in a predetermined angle, whereby the contact plates of the flashlight are properly pressed against corresponding contact buttons to establish a charging connection between the flashlight and the charging circuit.

2. The charging seat as claimed in claim 1, wherein the orientation device comprises a pair of guide blocks formed at opposite sides of the U-shaped groove and configured to correspond to two positioning recesses formed in opposite sides of the flashlight.

3. The charging seat as claimed in claim 1, wherein each contact button has an upper portion extending through a corresponding hole defined in a bottom of the U-shaped groove and a lower end formed with a flange retained by the hole, two springs are respectively provided between the two contact buttons and two copper blades secured in the base, and the charging circuit being electrically connected with the two contact buttons via the springs and the copper blades.

* * * * *